US008089532B2

(12) United States Patent
Mo et al.

(10) Patent No.: US 8,089,532 B2
(45) Date of Patent: Jan. 3, 2012

(54) METHOD AND APPARATUS PROVIDING PIXEL-WISE NOISE CORRECTION

(75) Inventors: Yaowu Mo, Arcadia, CA (US); Chen Xu, Alhambra, CA (US)

(73) Assignee: Aptina Imaging Corporation, George Town (KY)

( * ) Notice: Subject to any disclaimer, the term of this patent is extended or adjusted under 35 U.S.C. 154(b) by 1014 days.

(21) Appl. No.: 12/010,538

(22) Filed: Jan. 25, 2008

(65) Prior Publication Data
US 2009/0190005 A1    Jul. 30, 2009

(51) Int. Cl.
H04N 5/217    (2006.01)
H04N 9/64    (2006.01)

(52) U.S. Cl. .................. 348/241; 348/250

(58) Field of Classification Search .......... 348/241–254, 348/207.99; 382/272; 358/3.26, 3.27, 463; 377/58, 60, 61, 63; 257/292–294; 250/208.1; 327/91, 94
See application file for complete search history.

(56) References Cited

U.S. PATENT DOCUMENTS

| | | | |
|---|---|---|---|
| 5,965,871 A * | 10/1999 | Zhou et al. | ................ 250/208.1 |
| 6,777,660 B1 | 8/2004 | Lee | |
| 6,795,117 B2 | 9/2004 | Tay | |
| 6,831,686 B1 | 12/2004 | Koren et al. | |
| 6,914,627 B1 | 7/2005 | Dong | |
| 6,982,403 B2 | 1/2006 | Yang et al. | |
| 7,002,626 B2 | 2/2006 | Pain et al. | |
| 7,084,912 B2 | 8/2006 | Chieh | |
| 7,920,190 B2 * | 4/2011 | Moholt et al. | ................ 348/294 |
| 2003/0107663 A1 | 6/2003 | Cheng et al. | |
| 2004/0051797 A1 | 3/2004 | Kelly et al. | |
| 2004/0051802 A1* | 3/2004 | Krymski | ................ 348/308 |
| 2004/0233310 A1 | 11/2004 | Egawa et al. | |
| 2005/0185075 A1 | 8/2005 | Neter | |
| 2005/0243193 A1 | 11/2005 | Gove et al. | |
| 2006/0044440 A1 | 3/2006 | Park et al. | |
| 2006/0202295 A1 | 9/2006 | Wu et al. | |
| 2006/0256215 A1 | 11/2006 | Zhang et al. | |
| 2006/0262204 A1 | 11/2006 | Dosluoglu | |
| 2006/0262210 A1 | 11/2006 | Smith et al. | |
| 2006/0284998 A1 | 12/2006 | Park et al. | |
| 2007/0131846 A1 | 6/2007 | Eskerud | |
| 2007/0132868 A1 | 6/2007 | Lee et al. | |
| 2007/0195179 A1 | 8/2007 | Glenn et al. | |

FOREIGN PATENT DOCUMENTS

| | | |
|---|---|---|
| JP | 2000-261730 | 9/2000 |
| JP | 2004-015712 | 1/2004 |
| JP | 2005-311736 | 11/2005 |
| JP | 2006-157263 | 6/2006 |
| KR | 2001-0090613 | 10/2001 |
| KR | 2004-0084843 | 10/2004 |
| TW | 257803 B | 7/2006 |

OTHER PUBLICATIONS

L. McIlrath et al., "Design and Analysis of a 512×768 Current-Mediated Active Pixel Array Image Sesnsor", IEEE Transactions on Electron Devices, vol. 44, Issue: 10, pp. 1706-1705, Oct. 1997.
B. Fowler, "Low Noise Wide Dynamic Range Image Sensor Readout Using Multiple Reads During Integration (MRDI)", Pixel Devices Intl. Inc. (PDI), 2002.

(Continued)

*Primary Examiner* — Lin Ye
*Assistant Examiner* — Euel Cowan

(57) ABSTRACT

Methods and apparatuses providing pixel-wise noise correction using pixels to provide reference values during pixel readout operations.

10 Claims, 11 Drawing Sheets

OTHER PUBLICATIONS

V. Gruev et al., "Linear Current Mode Imager With Low Fix Pattern Noise", Proceedings on the 2004 International Symposium on Circuits and Systems, vol. 4, pp. IV-860-3, May 23-26, 2004.

A. El Carnal et al., "CMOS Image Sensors", Circuits and Devices Magazine, IEEE, vol. 21, Issue: 3, pp. 6-20, May-Jun. 2005.

* cited by examiner

US 8,089,532 B2

METHOD AND APPARATUS PROVIDING PIXEL-WISE NOISE CORRECTION

FIELD OF THE INVENTION

The embodiments described herein relate generally to imaging devices and, more specifically, to a method and apparatus providing pixel-wise noise correction.

BACKGROUND OF THE INVENTION

Solid state imaging devices, including charge coupled devices (CCD), complementary metal oxide semiconductor (CMOS) imaging devices, and others, have been used in photo imaging applications. A solid state imaging device circuit includes a focal plane array of pixels as an image sensor, each pixel including a photosensor, which may be a photogate, photoconductor, photodiode, or other photosensor having a doped region for accumulating photo-generated charge. For CMOS imaging devices, each pixel has a charge storage region, formed on or in the substrate, which is connected to the gate of an output transistor that is part of a readout circuit. The charge storage region may be constructed as a floating diffusion region. In some CMOS imaging devices, each pixel may further include at least one electronic device such as a transistor for transferring charge from the photosensor to the storage region and one device, also typically a transistor, for resetting the storage region to a predetermined charge level.

In a CMOS imaging device, the active elements of a pixel perform the necessary functions of: (1) photon to charge conversion; (2) accumulation of image charge; (3) resetting the storage region to a known state; (4) transfer of charge to the storage region; (5) selection of a pixel for readout; and (6) output and amplification of a signal representing pixel charge. Photo charge may be amplified when it moves from the initial charge accumulation region to the storage region. The charge at the storage region is typically converted to an image value by a source follower output transistor.

FIG. 1 illustrates a block diagram of a CMOS imaging device 110 having a pixel array 112 incorporating pixels in columns and rows. The pixels of each row in pixel array 112 can all be turned on at the same time by a row select line and the pixels of each column are selectively output by a column select line. A plurality of row and column lines is provided for the entire pixel array 112. The row lines are selectively activated by a row driver 114 in response to a row address decoder 116 and the column select lines are selectively activated by a column driver 120 in response to a column address decoder 122.

The CMOS imaging device 110 is operated by a control circuit 124 which controls the address decoders 116, 122 for selecting the appropriate row and column lines for pixel image acquisition and readout, and the row and column driver circuits 114, 120 which apply driving voltage to the drive transistors of the selected row and column lines.

The column driver 120 is connected to analog processing circuitry 808, including sample-and-hold circuits that sample and hold signals from the pixel array 112 and differential amplifiers that correct image signals as described below, by a greenred/greenblue channel 132 and a red/blue channel 134. Although only two channels 132, 134 are illustrated, there are effectively two green channels, one red channel, and one blue channel, for a total of four channels. Greenred (i.e., Green1) and greenblue (i.e., Green2) signals are readout at different times (using channel 132) and the red and blue signals are readout at different times (using channel 134). The analog processing circuitry 808 outputs processed greenred/greenblue signals G1/G2 to a first analog-to-digital converter (ADC) 126 and processed red/blue signals R/B to a second analog-to-digital converter 128. The outputs of the two analog-to-digital converters 126, 128 are sent to a digital processor 830, which processes the signals to perform pixel processing, such as demosiaicing and noise reduction, and outputs, for example, a 10-bit digital signal 136.

Each column is connectable to a sampling and holding circuit in the analog processing circuit 808 that reads a pixel reset signal $V_{RST}$ and a pixel image signal $V_{SIG}$ for selected pixel circuits. A differential signal ($V_{RST}-V_{SIG}$) is produced by differential amplifiers contained in the circuitry 808 for each pixel. The resulting signals G1/G2 (on the green channel 132) and R/B (on the red/blue channel 134) are digitized by a respective analog-to-digital converter 126, 128. The analog-to-digital converters 126, 128 supply digitized G1/G2, R/B pixel signals to the digital processor 830, which forms a digital image output (e.g., a 10-bit digital output). As noted, the digital processor 830 performs pixel processing operations.

FIG. 2 illustrates a block diagram of an example pixel array 112. The pixel array 112 contains rows and columns of pixels as described above with reference to FIG. 1. Some of these pixels, shown as active area 201, are used to generate photocharges based on incident light. Pixel array 112 may be formed on a substrate and be covered by other layers containing metal lines for carrying signals and photocharges, translucent materials to allow light to pass to photosensitive elements that create photocharges, and a color filter for controlling the wavelength range for the light that reaches each pixel's photosensitive element. The color filter may be patterned as a Bayer pattern, for example, to allow one of red, green, or blue light to reach each pixel in the active area 201. The Bayer pattern is designed such that one-half of the filters allow green light to pass, while red and blue filters each comprise 25% of the filters. Active area 201 may be surrounded on any side, or on multiple sides, by columns or rows of optical black pixels, such as optical black regions 202, 203, 204. Optical black regions 202, 203, 204 are those regions that receive no light, because the color filter or other mechanism (e.g., a light shield) is configured to block visible light over those pixels, for example. One optical black region is barrier area 202, which prevents charge leakage between the active area and the surrounding dark pixels. The other optical black area shown in FIG. 2 is optical black pixel area 203. The pixels in optical black regions 202, 203 are not used to create an image; rather they are used to compensate for noise in the image. For example, dark current in a sensor, that is, current that is present without incident light, may exhibit itself in optical black pixels 203. In such a system, it is possible to partially compensate for dark current in a sensor by measuring the dark current in the optical black pixels 203 and subtracting estimated dark current values from the active area 201 based on this measurement. Because this method depends on dark current values from the extreme edges of the active area, it is a crude measurement of the dark current as it affects smaller areas. At best, methods using the optical black pixels 203 approximate dark current offset values for a row of pixels.

As discussed above, an imager device (FIG. 1) contains a pixel array, which comprises rows and columns of pixels. Each pixel, in turn, contains a photosensor that convert incident light energy into a photocharge. This photocharge is converted to an image value that is sampled and held prior to noise correction and other processing steps. FIG. 3 depicts a flowchart for a known noise correction method for these signals.

Noise correction may take place in either or both of two domains, the analog domain and the digital domain. The analog domain processes signals prior to analog-to-digital conversion. The digital domain processes the digitized pixel signals in the image processor. The analog domain consists of all process steps within the area 330, while the digital domain consists of all process steps within the area 340. The analog domain is so named because the values that are processed therein are analog values, such as the voltage signal read out from a pixel, or a voltage offset or gain. The digital domain includes those steps that operate on digital values.

Prior to exposure to light, pixels are reset by connecting the floating diffusion region FD (FIG. 5A) to a reset voltage $V_{DD}$. This image reset value is read out and stored on a first sample-and-hold capacitor. After a pixel has been exposed to incident light and is read out, the resultant image value is read out along a column line to a second sample-and-hold capacitor. The image value stored at the second sample-and-hold capacitor may be subtracted from the reset value stored at the first sample-and-hold capacitor at this point (step 301).

The resulting value is then amplified by the analog gain (step 302) and is optionally adjusted by an analog offset value (step 303) before it is converted into a digital value by an analog-to-digital converter (step 304). The analog offset value is a value determined by the optically black pixels surrounding the active pixel array (FIG. 2). Once the signal voltage has been converted into a digital signal, the signal has moved from the analog domain 330 to the digital domain 340. The digital signal may be amplified by a digital gain value (step 305) and/or subjected to digital offset correction (step 306). The digital value may undergo certain other noise correction procedures, such as shading correction, which corrects for a disparity in the amount of light received by pixels at the extreme edges of the array (step 307). The digital value may then be stored in memory.

Another method of noise correction is shown in FIG. 4. As before, the image value is subtracted from the image reset value (step 401), and the result is amplified by an analog gain value (step 402). The signal produced by step 402 is then converted into a digital signal by an analog-to-digital converter (step 404). It is then determined whether the signal requires calibration in the analog domain (step 405). If so, a calibration offset value is determined (step 406) and subtracted from the analog signal (step 403), which is converted again into a digital value (step 404). If the signal does not need to be calibrated (as determined in step 405) or once the signal has been calibrated (step 403), the signal is then corrected for row-wise noise (step 407). This is based on the values of certain optical black pixels, as described above with reference to FIGS. 2 and 3. The signal is corrected by a channel offset (step 408) based on which color range of light the signal represents. The signal is corrected for so-called fixed pattern noise, or noise that is a result of relative sensitivities of different pixels to light (step 409). The signal may then be corrected for dark current (step 410). The signal may then be corrected for lens shading (step 411). The signal may then be amplified by a digital gain (step 412). Prior to being stored in memory, the value may be subjected to other forms of defect and noise correction. It will be obvious to one skilled in the art that the steps of the methods shown in FIGS. 3 and 4 may be re-ordered, and some steps may be added or removed, as the particular device or application requires.

These conventional methods for noise correction suffer from a number of defects. First, known methods correct for noise on a row-wise basis; that is, the methods will determine an amount of noise that affects a row and will correct for that amount of noise across each pixel in the row. This neglects the fact that noise may vary across a single row. In many imagers, row shading occurs, in which noise increases as a function of the column number in a row. Row-wise correction methods cannot correct for in-row noise.

Additionally, row-wise and column-wise correction methods often depend on a small set of pixels to sample noise, and then use the results to correct for noise on a larger set of pixels. If pixels within the small correction sample set are defective, the defect will affect a large number of pixels. Because the correction methods are applied linearly in rows or columns, a defective pixel sample for correction will cause obvious aberrations in an image (dark or bright rows are easily discernable to the human eye).

When using some existing noise correction methods, described above with reference to FIGS. 3 and 4, the pixels sampled to determine noise levels may be physically distant from the pixels from which the noise values are removed. The result is that any regional noise, such as noise from defects in the imager, infrared reflection, or temperature variations will not be detected by pixels that are far from the defect site. Additionally, when using rows or columns of optical black pixels to approximate dark current, a single defective or aberrant pixel in the optical black columns or rows may incorrectly influence an entire row or column in the resultant image. This leads to noticeable effects such as row-banding, in which a row of the image is noticeably brighter or darker than its surrounding rows or columns.

Accordingly, there is a need for imager devices that apply noise correction on a pixel-wise basis. Additionally, there is a need for an imager device that samples a wide variety of pixels for noise values prior to noise correction.

DETAILED DESCRIPTION OF THE INVENTION

In the following detailed description, reference is made to the accompanying drawings which form a part hereof, and in which is shown by way of illustration specific embodiments that may be practiced. These embodiments are described in sufficient detail to enable those of ordinary skill in the art to make and use them, and it is to be understood that structural, logical, or procedural changes may be made to the specific embodiments disclosed.

The terms "semiconductor substrate" and "substrate" are to be understood to include any semiconductor-based structure. The semiconductor structure should be understood to include silicon, silicon-on-insulator (SOI), silicon-on-sapphire (SOS), silicon-germanium, doped and undoped semiconductors, epitaxial layers of silicon supported by a base semiconductor foundation, and other semiconductor structures. When reference is made to the substrate in the following description, previous process steps may have been utilized to form regions or junctions in or over the base semiconductor or foundation.

The term "pixel," as used herein, refers to a photo-element unit cell containing at least a photosensor for converting photons to electrical changes. In the following description, the embodiments are described in relation to a CMOS imaging device for convenience; however, they have wider applicability to other pixels of other imaging devices. In addition, the photosensor of each pixel may be implemented as a pinned photodiode, a p-n junction photodiode, a Schottky photodiode, a photogate, or any other suitable photoconversion device.

Figures 5A, 5B:
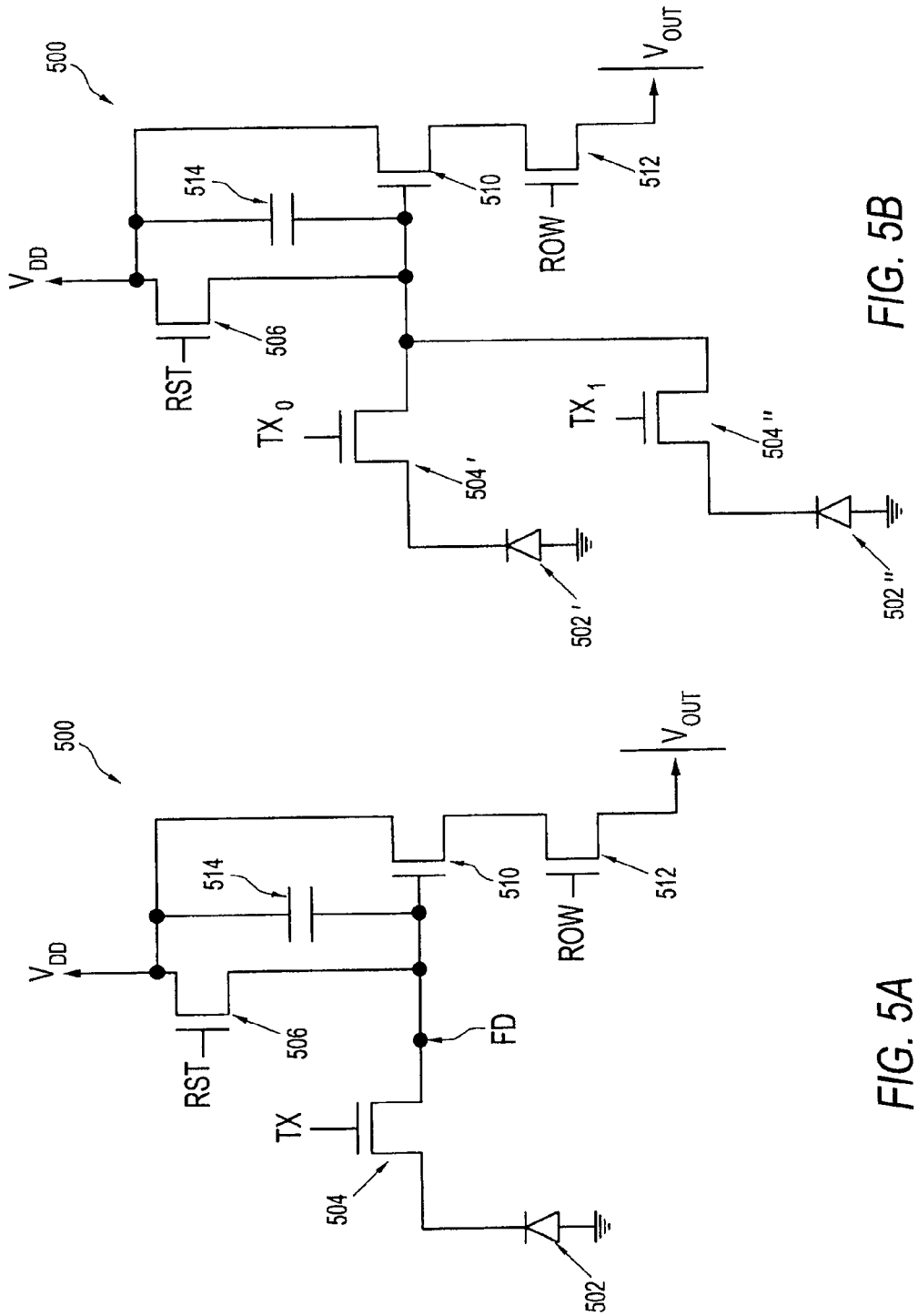
FIG. 5A is a schematic of a four-transistor pixel.
FIG. 5B is a schematic of two pixels with a shared readout structure.

FIGS. 5A and 5B are schematics of pixels known in the art. The following paragraphs describe the components within each pixel for later reference in subsequent sections.

FIG. 5A is a schematic of a typical four transistor pixel. The operation of the pixel is explained in the following description of the figure.

A typical four transistor (4T) CMOS image sensor pixel 500 includes a photosensor 502 (e.g., photodiode, photogate, etc.), transfer transistor 504, floating diffusion region FD, reset transistor 506, source follower transistor 510, and row select transistor 512. The photosensor 502 is connected to the floating diffusion region FD by the transfer transistor 504 when the transfer transistor 504 is activated by a transfer control signal TX.

The reset transistor 506 is connected between the floating diffusion region FD and an array pixel supply voltage $V_{DD}$. A reset control signal RST is used to activate the reset transistor 506, which resets the floating diffusion region FD to the array pixel supply voltage $V_{DD}$ level as is known in the art. The floating diffusion region FD may also be connected to a capacitor 514, which may be used to increase the storage capacity of the floating diffusion region FD.

The source follower transistor 510 has a gate connected to the floating diffusion region FD and is connected between the array pixel supply voltage $V_{DD}$ and the row select transistor 512. The source follower transistor 510 converts the charge stored at the floating diffusion region FD into an electrical output voltage signal $V_{OUT}$. The row select transistor 512 is controllable by a row select signal ROW for selectively connecting the source follower transistor 510 and its output image value $V_{OUT}$ to a column line of a pixel array.

FIG. 5B is a schematic of a two-way-shared pixel arrangement. Photosensors 502' and 502" are adjacent pixels in different rows. Each photosensor 502', 502" has a transfer transistor (504', 504"), but all other readout components are shared. Other arrangements exist, including four-way-shared pixels (in which readout circuitry is shared among four photosensors). Embodiments may use any of these architectures without limitation.

Embodiments use reference values from other pixels to determine the level of noise experienced by an active pixel. A pixel is an active pixel when it is in the process of being read out. As in the prior art, two values are read out of each pixel, an image value $V_{SIG}$ and an image reset value $V_{RST}$. Embodiments also read out another pair of values, a reference value $RV_{SIG}$ and a reference reset value $RV_{RST}$. The pixel that supplies the reference value $RV_{SIG}$ and the reference reset value $RV_{RST}$ is referred to herein as a reference pixel. These values represent the charge in a reference pixel at the respective times that $V_{SIG}$ and $V_{RST}$ are read out from the active pixel. By comparing $RV_{SIG}$ and $V_{SIG}$, embodiments can determine the amount of noise present in $V_{SIG}$. A similar comparison is done between $RV_{RST}$ and $V_{RST}$.

As described herein, an "image value" is a signal or charge read out from a pixel to be read out (the active pixel) that represents the amount of light received by the pixel. An "image reset value" is a signal or charge read out from an active pixel after it has been reset (as described above with reference to FIGS. 5A, 5B). A "reference value" is a signal or charge read out from a reference pixel when an image value is read out from an active pixel. A "reference reset value" is a signal or charge read out from a reference pixel when an image reset value is read out from an active pixel.

FIGS. 6A, 6B, 6C, and 7 depict an embodiment for pixel-wise noise correction in which reference reset and signal values are read out from a pixel adjacent a pixel being read out. As is explained below in more detail, the reference values are then compared to the readout reset and signal values to correct for pixel-wise noise, as described below.

Figure 6A:
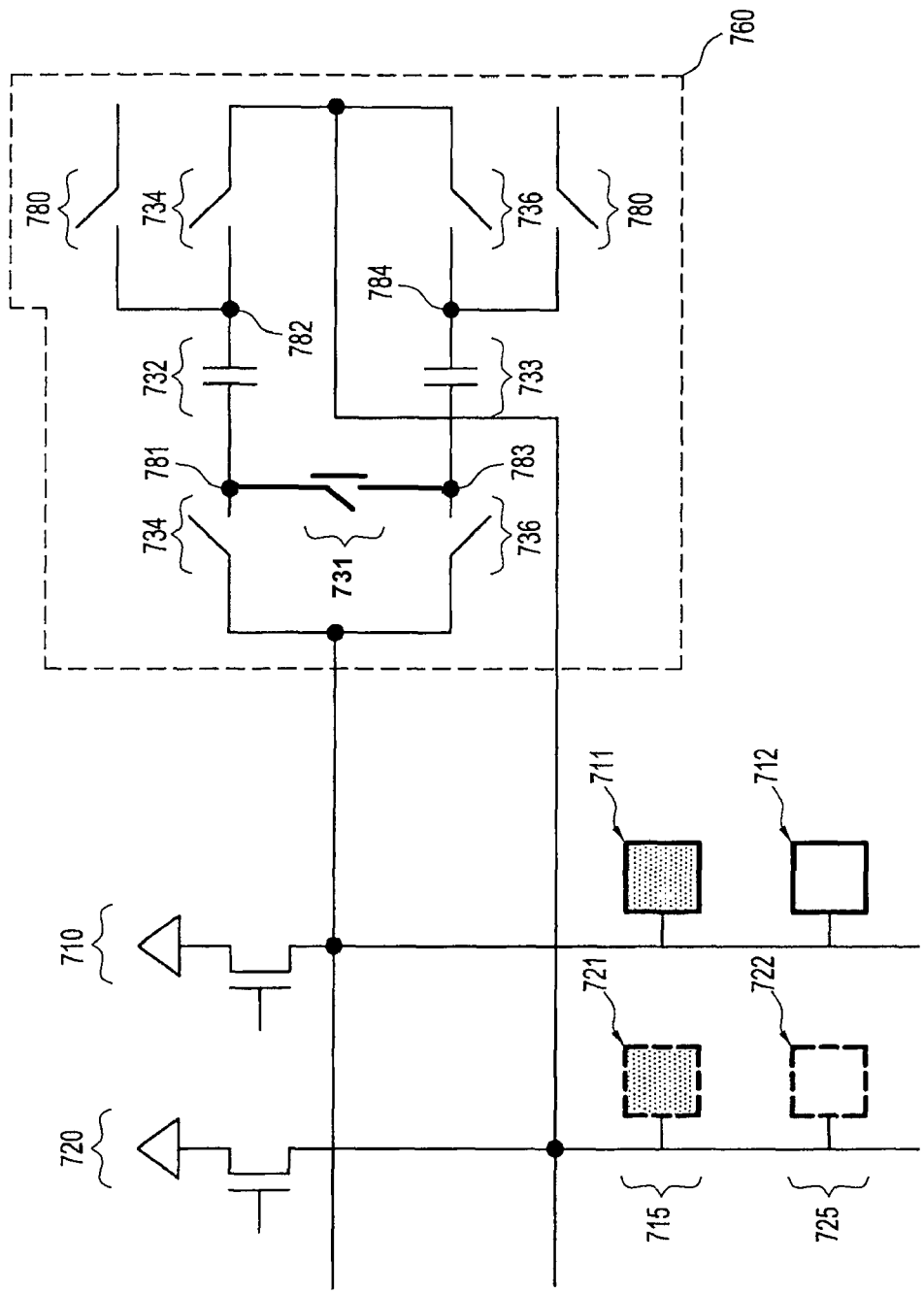
FIG. 6A is a schematic of a pixel-wise noise correction system according to an embodiment described herein.
Figure 6B:
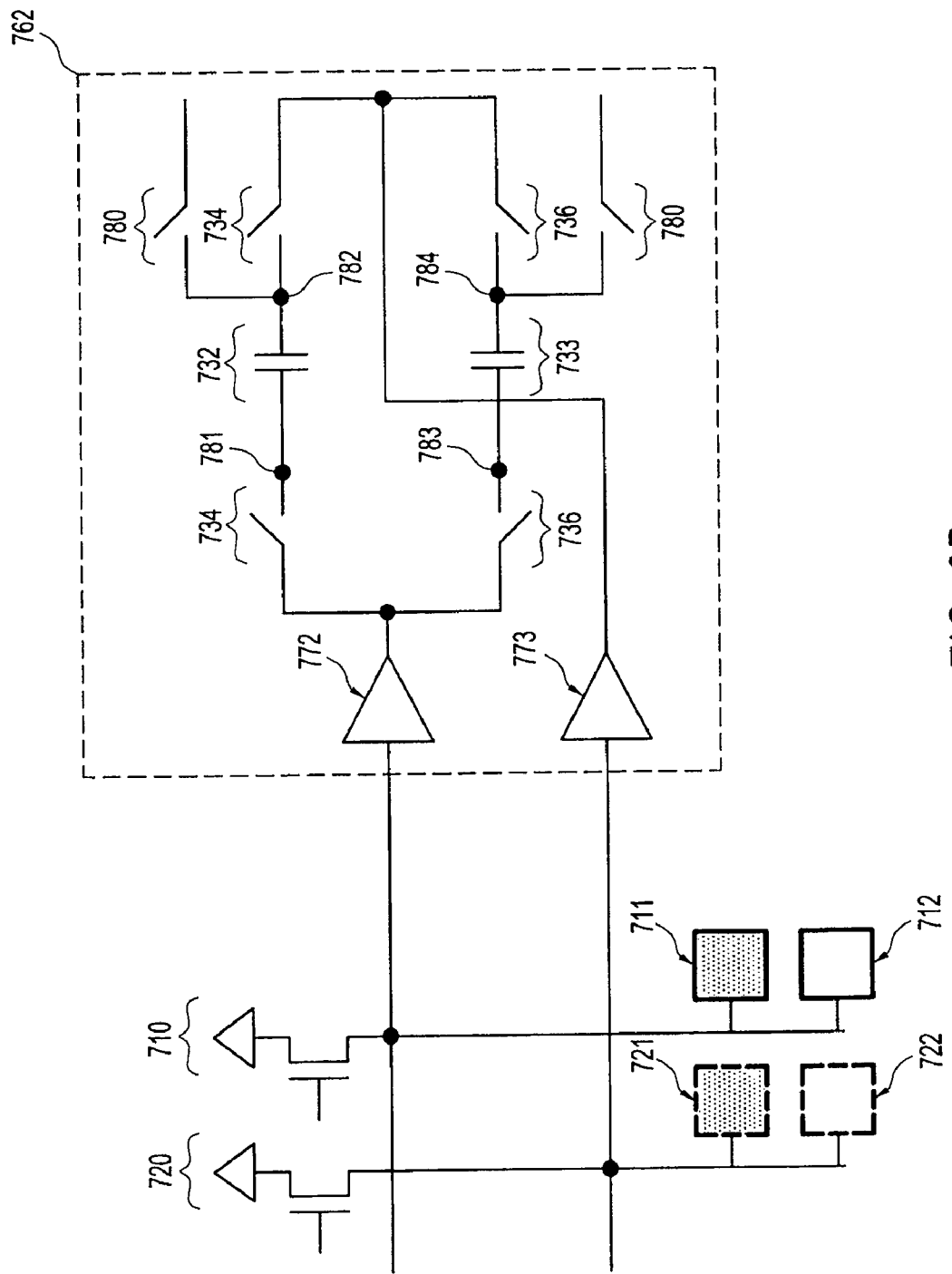
FIG. 6B is a schematic of a pixel-wise noise correction system according to an embodiment described herein.
Figure 6C:
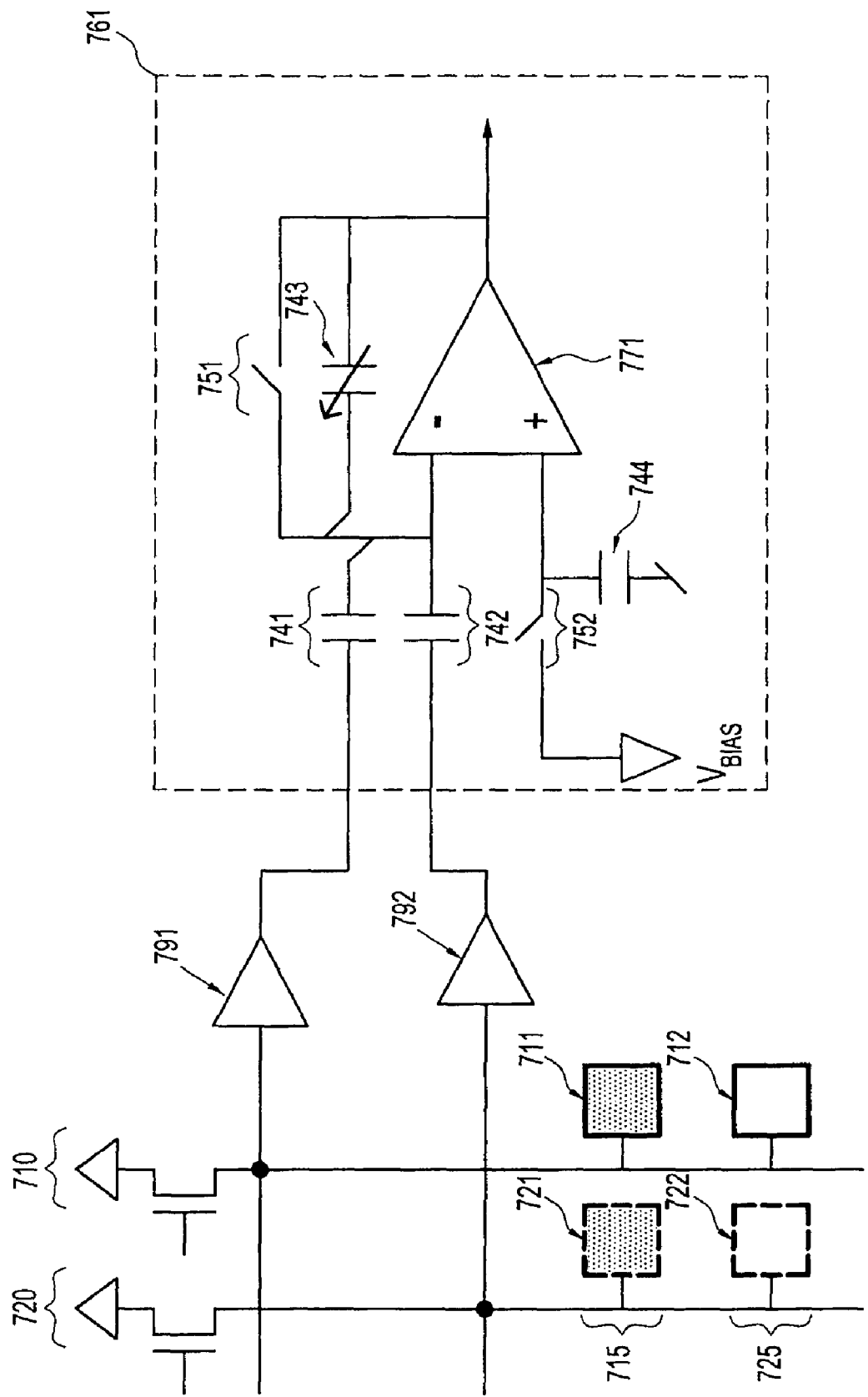
FIG. 6C is a schematic of a pixel-wise noise correction system according to an embodiment described herein.

FIGS. 6A, 6B, and 6C depict pixels 711, 712, 721, 722 in two columns 710, 720 according to an embodiment. For illustration purposes only, embodiments described herein will make reference to pixels having a Bayer color filter pattern, however the embodiments are applicable to pixels having any filter pattern or no filters. In the embodiment described below, pixels 711 and 722 are pixels receiving green light, while pixel 712 receives blue light and pixel 721 receives red light. Column 710 includes pixels 711 and 712. Column 720 includes pixels 721, 722. When pixel 711 is read out, pixel 721 may be used as a reference pixel, providing a reference value $RV_{SIG}$ and a reference reset value $RV_{RST}$. Pixel 722 may be used as a reference pixel during the read out of pixel 712. During the readout of pixel 721, pixel 711 may be a reference pixel, or a pixel in the next column (not shown) may be a reference pixel. Any pixel that is not active may be a reference pixel; however, it is preferable that a reference pixel be near the active pixel to which it will be compared.

Pixels 711 and 721 are in a first row 715, and pixels 712 and 722 are in a second row 725. During readout, the pixels are activated row-by-row, and each column of an active row may be read out in sequence or parallel. In the embodiment of FIG. 6A, the row 715 containing pixels 711 and 721 may be activated first. That row may be read out column-by-column across the row, with column 710 being read out before column 720, or multiple columns could be read out simultaneously as described below with reference to FIG. 7.

According to known methods of correlated double sampling, two values are read out for each active pixel: an image reset value $V_{RST}$ representative of the charge present on the floating diffusion region FD (FIGS. 5A, 5B) after it has been reset by reset transistor 506 (FIGS. 5A, 5B) and an image value $V_{SIG}$ representative of the charge present on the floating diffusion region FD (FIGS. 5A, 5B) after the photocharge is transferred to it through transfer transistor 504 (FIGS. 5A, 5B). To perform pixel-wise noise correction, embodiments also read out a reference value $RV_{SIG}$ and a reference reset value $RV_{RST}$. The reference value $RV_{SIG}$ and the reference reset value $RV_{RST}$ represent the charge present on the floating diffusion region FD (FIGS. 5A, 5B) of a reference pixel in a different column or row, for example, prior to either resetting the pixel or transferring the photocharge to the floating diffusion region FD (FIGS. 5A, 5B). As described above, the reference value of pixel 721 may be used to offset the image value of pixel 711, for example, while the reference reset value of pixel 721 may be used to offset the image reset value of pixel 711. The reference value and reference reset value of pixel 721 will represent the level of noise present in that pixel 721 at the times in which they are sampled, which will be very close to the value of noise present in pixel 711 at that time. The next pixel in the row, not shown, could then serve to provide a reference value and a reference reset value during the readout of pixel 721. Similarly, during the readout of the next row, another pixel 722 in column 720 provides a reference value and a reference reset value during the readout of a pixel 712 in column 710.

FIG. 6A also shows pixel-wise noise correction circuit 760 for the pixels 711, 712. The same circuit 760 may be used for all pixels 711, 712 in column 710, because no more than one row of pixels is active at any time. Prior to reading out a pixel 711, crossbar switch 731 is closed to equalize the charges between reset capacitor 732 and signal capacitor 733. Crossbar switch 731 is then opened. Pixel 711 is reset, but pixel 721 is not. The reset sample-and-hold switches 734 are closed, simultaneously reading out the image reset value from active pixel 711 (which is stored at reset node 781) and the reference reset value from reference pixel 721 (which is stored at reset reference node 782). The reset sample-and-hold switches 734 are then opened. The reset capacitor 732 now holds a voltage that is the difference between the charges at its plates (that is, the voltage of reset capacitor 732 is equal to the difference between the reference reset value $RV_{RST}$ at node 782 and the image reset value $V_{RST}$ at node 781).

A transfer signal is then applied to pixel 711, transferring the charge of its photosensor to its floating diffusion region FD (FIG. 5A). Signal sample-and-hold switches 736 are then closed to store the image value $V_{SIG}$ of the active pixel 711 at signal node 783 and to store the reference value $RV_{SIG}$ from reference pixel 721 at signal reference node 784. Signal sample-and-hold switches are opened to electrically isolate the signal capacitor 733. The signal capacitor 733 has a voltage equal to the difference between the charges at its plates, that is, the difference between the image value $V_{SIG}$ and the reference value $RV_{SIG}$. When column select switches 780 are closed, the voltages of the reset capacitor 732 and signal capacitor 733 may be read out. Signal capacitor 733 has a voltage that is noise corrected, that is, it represents the difference between the image value $V_{SIG}$ from the active pixel 711 and the reference value $RV_{SIG}$ from the reference pixel 721. Reset capacitor 732 similarly provides a voltage that represents the image reset value $V_{RST}$ corrected for noise based on the reference reset value $RV_{RST}$.

Using a reference value or reference reset value from one pixel to estimate the noise value present in an adjacent pixel provides a number of advantages. The noise values of adjacent pixels are often very similar, so using a reference pixel, that is, a pixel providing reference values and reference reset value, close in physical proximity to an image pixel increases the accuracy of the method beyond that achieved by using optical black pixels to estimate noise values for entire rows. Though the embodiments of FIGS. 6A, 6B, and 6C use pixels adjacent the active pixels to provide reference values when reading out a pixel value, the reference values may come from pixels that are further away from the active pixel. Because the accuracy of the reference value may decrease with distance, it is preferable that reference values be taken from a pixel adjacent the active pixel. Additionally, if a reference value or reference reset comes from a defective pixel, the defect only affects the noise correction of one pixel. This avoids the creation of certain visual artifacts, such as row banding.

FIG. 6B shows an embodiment substantially identical to the embodiment of FIG. 6A, except that pixel-wise noise correction circuit 762 includes column amplifiers 772, 773 that may amplify the values from columns 710, 720. Column amplifiers 772, 773 allow for column-wise signal amplification before the reference, image, reference reset and image reset values from columns 710 and 720 are stored on opposite plates of the reset capacitor 732 or signal capacitor 733, as described above with reference to FIG. 6A. By adjusting the amplification of each column, the pixel-wise noise correction circuit 762 may be made more accurate.

FIG. 6C shows an embodiment having another pixel-wise noise correction circuit 761 discussed herein. The pixel-wise noise correction circuit 761 comprises an image sample capacitor 741, a reference sample capacitor 742, a reset switch 751, a resistance capacitor 743, a column amplifier 771, a bias capacitor 744, a bias sample switch 752, and a bias voltage source $V_{Bias}$. The top plate of image sample capacitor 741 is connected to column 710 and stores image and image reset values from pixels 711, 712 on that column 710. The top plate of reference sample capacitor 742 is connected to column 720 and stores reference charges and reference reset charges from pixels 721, 722 on that column 720. The bottom plates of image sample capacitor 741 and reference sample capacitor 742 are electrically connected to each other and to reset switch 751, resistance capacitor 743, and one input of column amplifier 771. Column amplifier 771 amplifies the charge received at that input (which represents the difference between the values stored at the top plates of image sample capacitor 741 and reference sample capacitor 742), based in part on the charge stored on bias capacitor 744 (received from bias voltage source $V_{Bias}$ when bias sample switch 752 is closed). The output from the column amplifier 771 is then provided to sample-and-hold circuits (not shown). The noise correction circuit 761 in FIG. 6C is thus used to correct the image signals from pixels 711, 712 in column 710 based on values from reference pixels 721, 722 in column 720.

Figure 7:
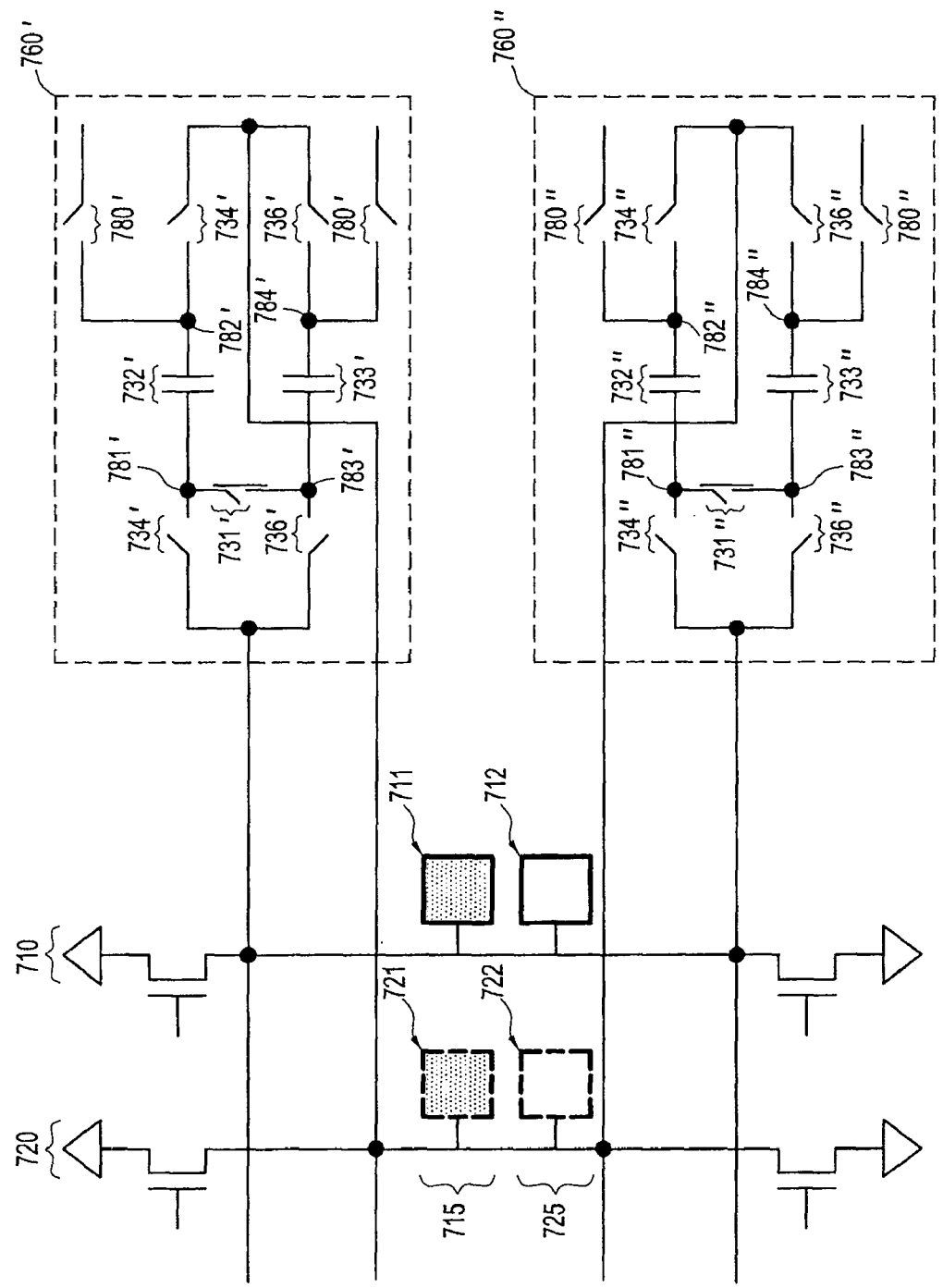
FIG. 7 is a schematic of a pixel-wise noise correction system for simultaneously reading out two rows according to an embodiment described herein.

FIG. 7 shows an embodiment in which two rows may be read out simultaneously. In the embodiment of FIGS. 6A, 6B, and 6C, row 715 must be completely read out before row 725 may be read out. In the embodiment of FIG. 7, however, row 715 may be read out to a first set of noise correction circuits (such as noise correction circuit 760') and row 725 may simultaneously be read out to a second set of noise correction circuits (such as noise correction 760"). The operation of the embodiment in FIG. 7 is identical to that of the embodiment of FIG. 6. Because the embodiment of FIG. 7 is capable of reading out two rows at once, it achieves faster readout times across the entire array.

Figure 1:
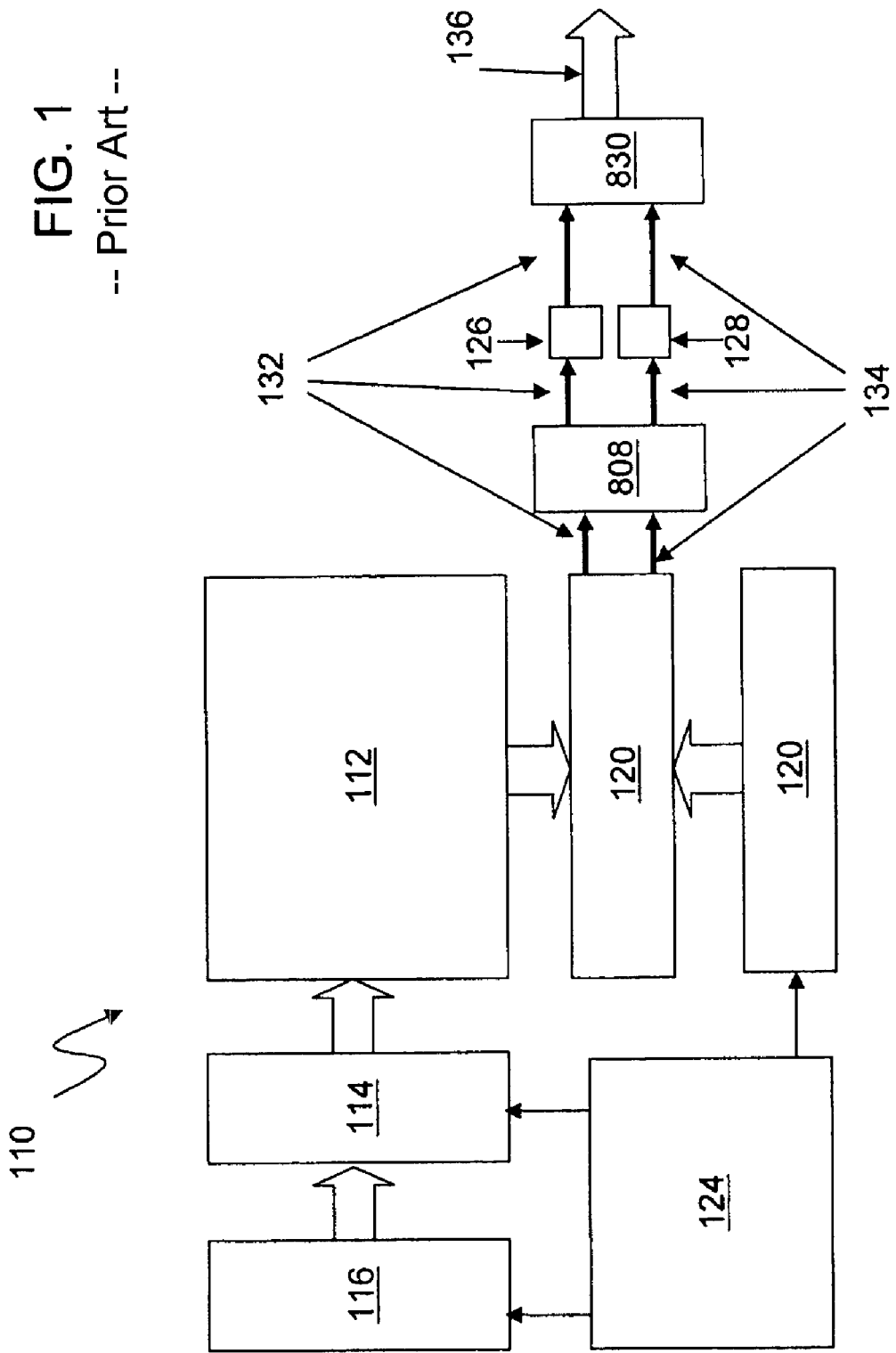
FIG. 1 is block diagram of an imager device having a pixel array.
Figure 2:
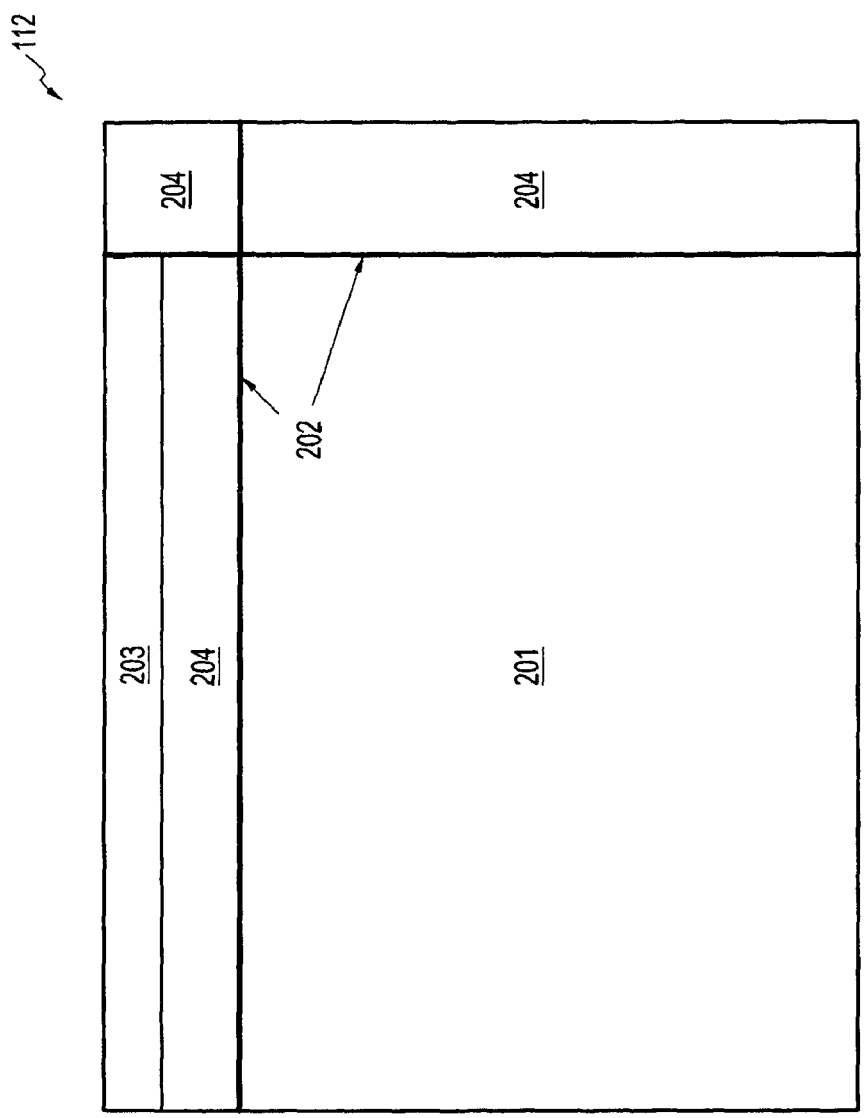
FIG. 2 is a representation of a pixel array having optical black pixels and tied optical black pixels.
Figure 3:
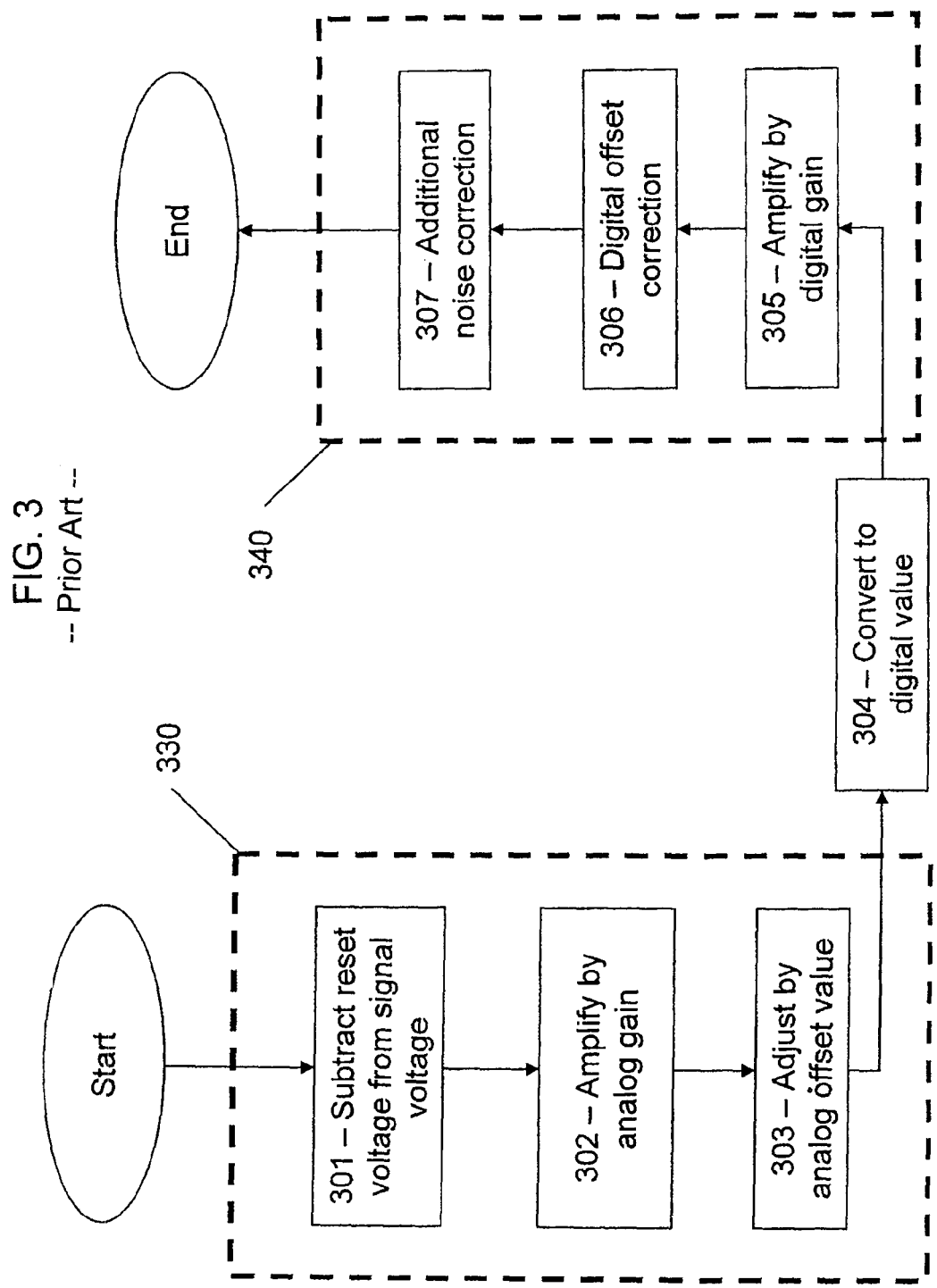
FIG. 3 is a diagram of a noise correction process.
Figure 4:
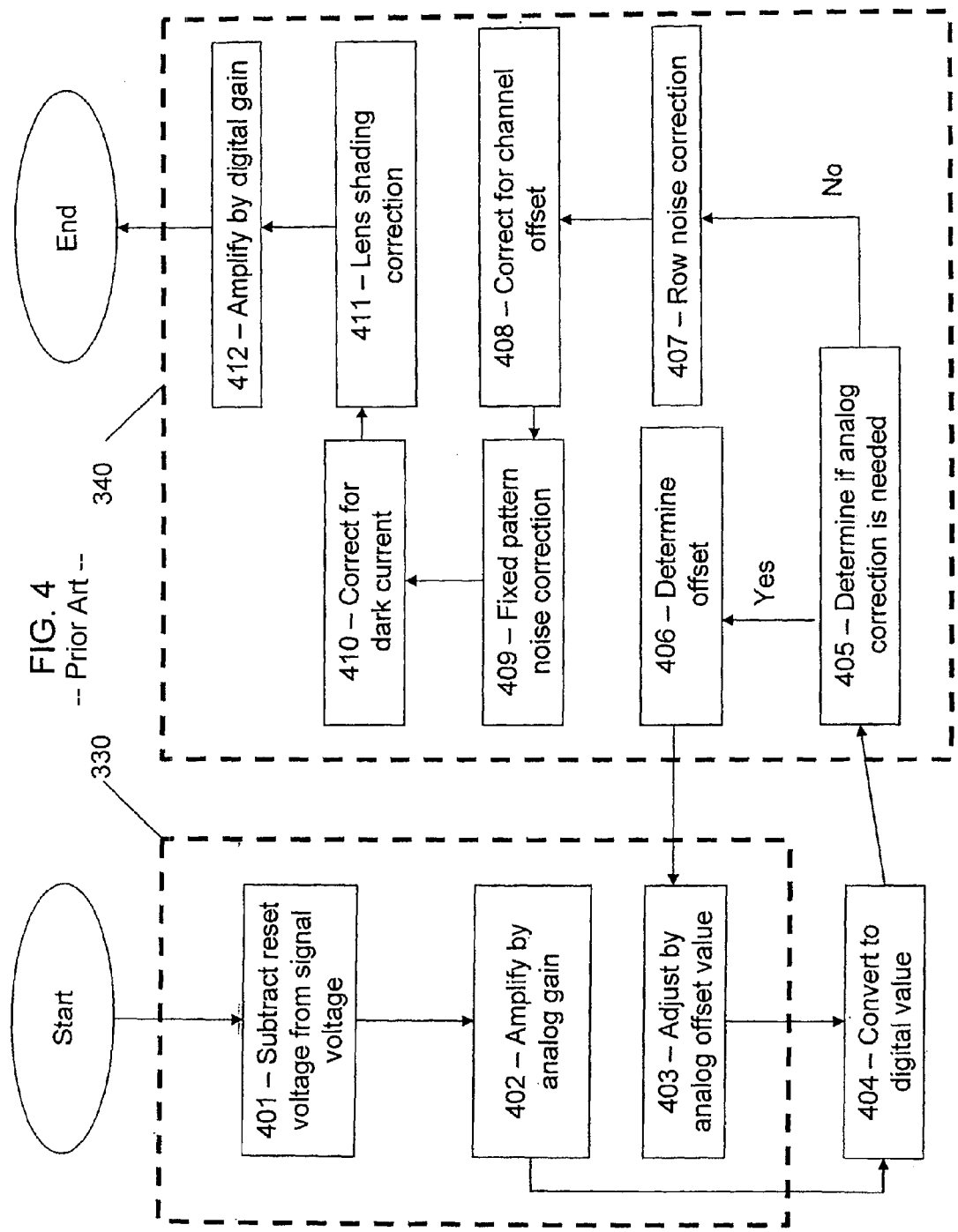
FIG. 4 is a diagram of a noise correction process.
Figure 8:
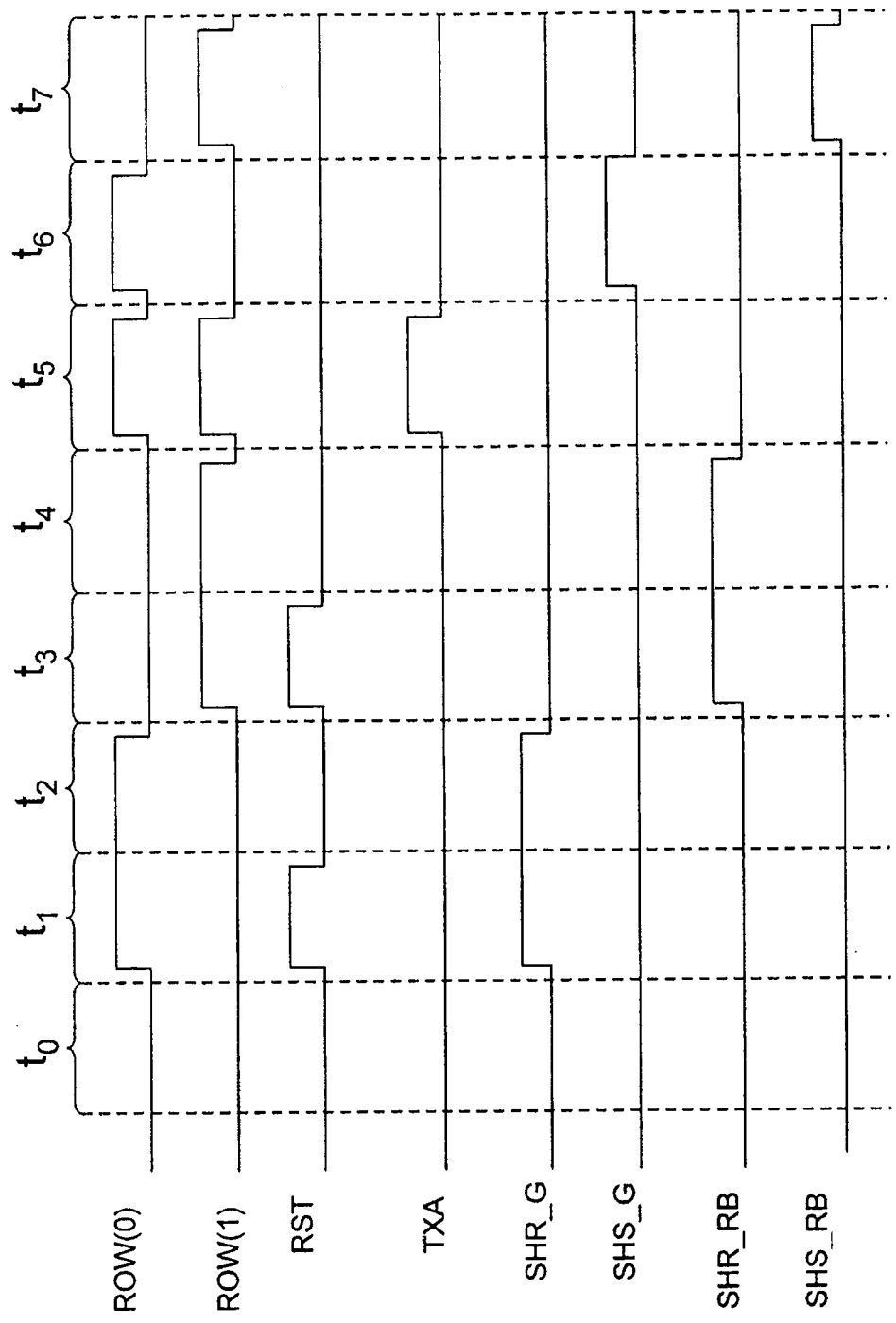
FIG. 8 is a timing diagram showing the use of signals by one embodiment described herein.

FIG. 8 shows a timing diagram for the embodiment of FIG. 7. The ROW(0) and ROW(1) signals are used to designate which row is currently active. Embodiments may have a ROW(n) signal for each row in the pixel array 112 (FIG. 1) to designate that row as currently active for readout. While a row is activated by its associated ROW(n) signal, signals RST, TXA, SHR_G, SHR_RB, SHS_G, and SHS_RB may be used to read out and store the photocharges stored in the pixels in that row. The operation of these signals is discussed below with reference to the timing diagram of FIG. 8.

The RST signal is used to activate the reset transistors 506 (FIG. 5A) to reset the voltage of the floating diffusion regions FD (FIG. 5A) of pixels in the currently activated row. The TXA signal is used to transfer the charge from the photosensors 502 (FIG. 5A) to the associated floating diffusion regions FD (FIG. 5A) in pixels in even-numbered columns of the currently activated row, such as column 710 (FIG. 7). A TXB signal (not shown) performs the same function with respect to odd numbered columns of the currently activated row, such as column 720 (FIG. 7). The SHR_G signal is used to sample and hold the image reset value from a green pixel after it has been reset. That image reset value is sampled and held by a sample-and-hold capacitor, such as 732', 732" (FIG. 7). The SHR_RB signal is similarly used to sample and hold the image reset value from a red or blue pixel after it has been reset to another sample-and-hold capacitor, such as 732', 732" (FIG. 7). The SHS_G and SHS_RB signals are used to sample-and-hold image signals from green pixels and red or blue pixels, respectively, after their photocharges have been transferred to their floating diffusion regions FD. These image signals may be stored on different sample-and-hold capacitors 733', 733" (FIG. 7) than the image reset signals.

The timing diagram of FIG. 8 shows one cycle of the control signals for reading out a pair of pixels, such as the pixels of FIGS. 5A, 6A, 6B, 6C, and 7. For purposes of this discussion, pixels 711 and 721 (FIG. 8) are assumed to be in $row_0$ (designated as 715 in FIG. 7), while pixels 712 and 722 (FIG. 8) are in $row_1$ (designated as 725 in FIG. 7). When the cycle begins, during time $t_0$, the pixels 711, 712, 721, 722 have been exposed to incident light and have accumulated photocharges in their photosensors.

During time $t_1$, the ROW(0), RST, and SHR_G signals are asserted. Because ROW(0) is asserted, the associated $row_0$ 715 is activated. The RST signal activates the reset transistors 506 (FIG. 5A) of those pixels 711, 721 in activated $row_0$ 715 to reset their floating diffusion regions FD (FIG. 5A). The SHR_G signal is activates the reset sample-and-hold switches 734' for the green pixel 711 (FIG. 8) to sample the image reset value from the green pixel 711 at node 781'. Also during time $t_1$, another reset sample-and-hold switch 734', connected between node 782' and a reference pixel 721, is activated by the same SHR_G signal, storing the reference reset value from reference pixel 721 at node 782'. At the end of time $t_1$, the voltage of capacitor 732' represents the difference between the image reset value of the active pixel 711 (stored at node 781') and the and the reference reset value of the reference pixel 721 (stored at node 782').

During time $t_2$, the RST signal is not asserted, disconnecting the floating diffusion regions FD (FIG. 5A) of pixels 711 and 721 (FIG. 7) from the supply voltage $V_{DD}$ (FIG. 5A)

During time $t_3$, the SHR_G signal is not asserted, opening the reset sample-and-hold switches 734' and isolating the nodes 781' and 782' from pixels 711 and 721. The ROW(1) signal is asserted, activating the pixels 712, 722 in $row_1$ 725. In an identical manner as described above with reference to times $t_1$ and $t_2$, during times $t_3$ and $t_4$ the image reset value from active pixel 712 and the reference reset value from reference pixel 722 are read out and stored at nodes 781" and 782".

During time $t_5$, the ROW(0), ROW(1), and TXA signals are asserted, activating both rows 715, 725 and transferring the photocharges from the photosensors 502 (FIG. 5A) in pixels 711, 712 to their respective floating diffusion regions FD (FIG. 5A). Because TXA activates the transfer transistors 504 (FIG. 5A) of only even-numbered columns, such as column 710, pixels 721, 722 in odd-numbered columns, such as column 720, are unaffected by this operation.

During time $t_6$, signals ROW(0) and SHS_G are asserted, closing the signal sample-and-hold switches 736' and storing the image value from pixel 711 (that is, the value on floating diffusion region FD representing the amount of light received by the pixel and converted to photocharge) at signal node 783'. The reference value from pixel 721 is simultaneously stored at signal reference node 784'. Because the TXA signal only causes photocharges to be transferred to floating diffusion regions FD (FIG. 5A) of pixels 711, 712 in column 710, the reference value from pixel 721 is not associated with a photocharge stored in that pixel. Instead, the reference value represents the amount of charge present in the pixel 721 during time $t_6$ due to other causes (such as charged that has leaked into the pixel 721 from other sources). During time $t_7$, the process described above with reference to time $t_6$ is repeated using active pixel 712, reference pixel 722, signal node 783", and signal reference node 784".

The TXB signal, though not shown in the timing diagram of FIG. 8, is used in a manner identical to the TXA signal during the readout of the odd-numbered columns. Each row of the pixel array 112 (FIG. 1) may be read out completely in two cycles of the timing shown in FIG. 8, first using TXA to read out the even-numbered columns and then repeating the process using TXB instead of TXA for the odd-numbered columns.

The embodiments described above solve the problem of noise-correction at a pixel-wise level through the use of adjacent or nearby pixels as representative pixels. By using each pixel once as a representative pixel, any defective pixel will cause an aberrant value in only a single other pixel value when read out. Noise correction may also be accomplished at the single pixel level, allowing for more accurate amounts of noise correction. Where the representative pixel is close to the active pixel, or preferably adjacent, the embodiments described above are highly sensitive to localized sources of noise in an imager.

Figure 9:
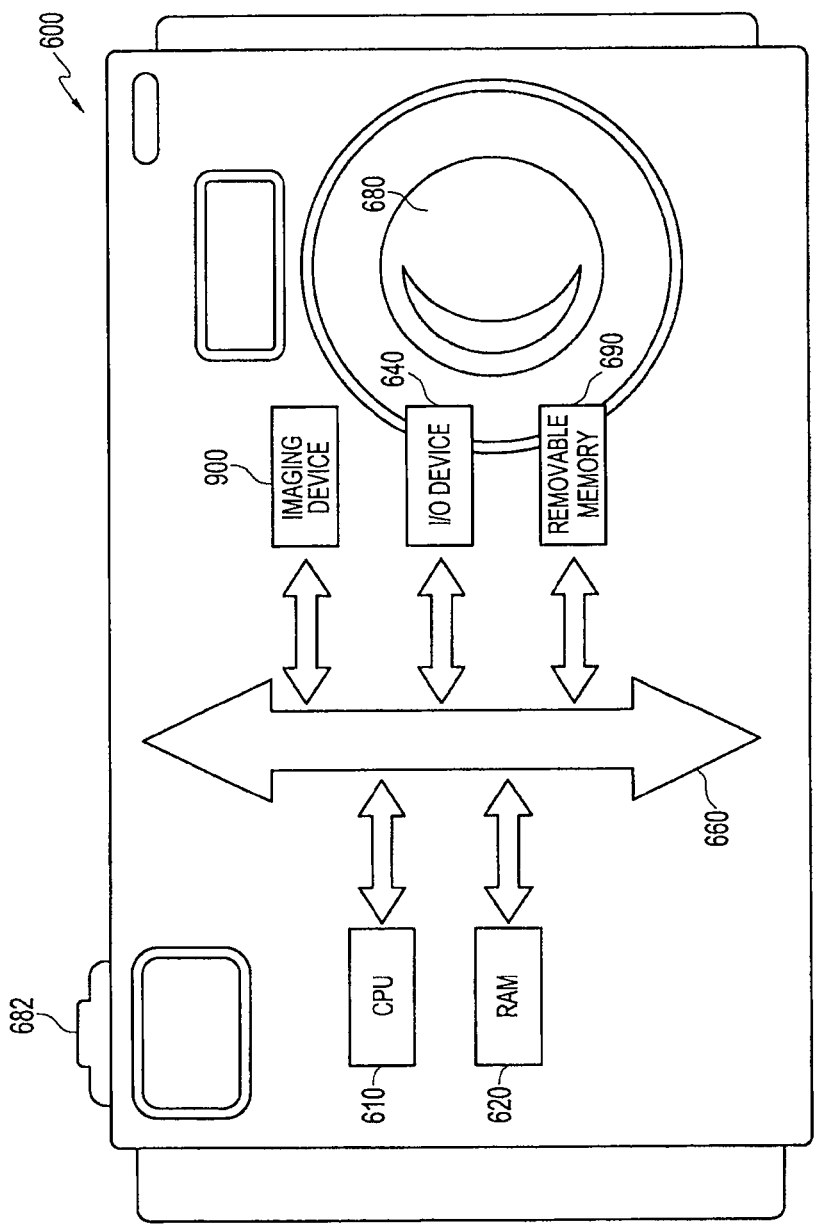
FIG. 9 shows a system incorporating at least one imaging device in accordance with an embodiment described herein.

FIG. 9 shows a typical imaging system 600, such as, for example, a camera. The system 600 is an example of a system having digital circuits that may include an imaging device 900. Without being limiting, such a system could include a computer system, camera system (such as a digital still camera, digital single-lens reflex camera, or digital video camera), scanner, machine vision, vehicle navigation system, video phone, surveillance system, auto focus system, star tracker system, motion detection system, image stabilization system, and other systems employing an imaging device 900.

System 600, for example, a camera system, includes a lens 680 for focusing an image on the imaging device 900 when a shutter release button 682 is pressed. System 600 generally comprises a central processing unit (CPU) 610, such as a microprocessor that controls camera functions and image flow, and communicates with one or more input/output (I/O) devices 640 over a bus 660. The imaging device 900 also communicates with the CPU 610 over the bus 660. The system 600 also includes random access memory (RAM) 620, and can include removable memory 650, such as flash memory, which also communicates with the CPU 610 over the bus 660. The imaging device 900 may be combined with the CPU 610, with or without memory storage on a single integrated circuit, such as, for example, a system-on-a-chip, or on a different chip than the CPU 610. As described above, image data from the imaging sensor 802 (FIG. 9B) can be output from the imaging device 900 and stored, for example in the random access memory 620, on a removable memory 650, or in the CPU 610.

While the embodiments have been described in detail in connection with embodiments known at the time, it should be readily understood that the claimed invention is not limited to the disclosed embodiments. Rather, the embodiments can be modified to incorporate any number of variations, alterations, substitutions, or equivalent arrangements not heretofore described. For example, while the embodiments are described in connection with a CMOS imaging sensor, they can be practiced with other types of imaging sensors. Additionally, three or five channels, or any number of color channels may be used, rather than four, for example, and they may comprise additional or different colors/channels than greenred, red, blue, and greenblue, such as e.g., cyan, magenta, yellow (CMY); cyan, magenta, yellow, black (CMYK); or red, green, blue, indigo (RGBI) or other color combinations. Accordingly, the invention is not limited by the foregoing description, but is only limited by the scope of the claims appended hereto.

What is claimed as new and desired to be protected by Letters Patent of the United States is:

1. An imager comprising:
   a pixel array comprising pixels arranged in rows and columns; and
   a plurality of sample-and-hold circuits, wherein the pixel array includes a first set of pixels and a second set of pixels that receive incident light during an image acquisition phase, wherein each sample-and-hold circuit is configured to sample and hold an image value from the first set of pixels in the pixel array, and wherein each sample-and-hold circuit is configured to sample and hold a reference value from the second set of pixels in the pixel array, and wherein each sample-and-hold circuit comprises a first capacitor, and each image value that is sampled and held is stored at a first plate of the first capacitor and each reference value is stored at a second plate of the first capacitor.

2. An imager comprising:
   a pixel array comprising pixels arranged in rows and columns; and
   a plurality of sample-and-hold circuits, wherein the pixel array includes a first set of pixels and a second set of pixels that receive incident light during an image acquisition phase, wherein each sample-and-hold circuit is configured to sample and hold an image value from the first set of pixels in the pixel array, and wherein each sample-and-hold circuit is configured to sample and hold a reference value from the second set of pixels in the pixel array wherein each sample-and-hold circuit is further configured to sample hold an image reset value from the first set of pixels, and each sample-and-hold circuit is configured to sample and hold a reference reset value from the second set of pixels, and wherein each sample-and-hold circuit comprises a reset capacitor; and each image value that is sampled and held is stored at a first plate of the reset capacitor and each reference value is stored at a second plate of the reset capacitor.

3. A method of operating an image sensor comprising an array of pixels arranged in columns and rows, the method comprising:
   exposing the array of pixels to incident light to generate photocharges in the pixels;
   activating a row of pixels to be read out;
   storing a first value from a first pixel in the row at a first plate of a signal capacitor;
   storing a second value from a second pixel in the row at the second plate of a signal capacitor; and
   selectively reading a noise-corrected value from one of the first and second plate of capacitor;
   wherein the noise-corrected value represents the first signal corrected for noise based at least on the second signal.

4. The method of claim 3, wherein the second pixel is adjacent the first pixel.

5. The method of claim 3, further comprising:
   storing a first reset value from the first pixel at a first plate of a reset capacitor;
   storing a second reset value from the second pixel at the second plate of the reset capacitor;
   selectively reading a noise-corrected reset value from one of the first and second plates of the reset capacitor;
   wherein the noise-corrected reset value represents the first reset value corrected for noise based at least on the second reset value.

6. The method of claim 3, further comprising:
   digitizing the noise-corrected value; and
   applying digital processing to the digitized noise-corrected value;
   wherein the digital processing includes one action chosen from the group consisting of: amplification, row-wise noise-correction, and lens shading.

7. A method of reading out the values in a pixel array, the pixel array comprising photosensitive pixels arranged in rows and columns and each pixel comprising a photosensitive element and a floating diffusion region, the method comprising:
   asserting a first row activation signal associated with a first row in the pixel array to activate the first row;
   asserting a reset signal to reset the charge on the floating diffusion regions of all pixels in the first row;
   asserting a first reset sample-and-hold signal to sample and hold the reset charge from the floating diffusion regions of a first set of pixels in the first row;
   turning off the reset signal;
   turning off the first reset sample-and-hold signal;
   asserting a first transfer signal associated with the first set of pixels to transfer charge from the photosensitive element to the floating diffusion region of each of the first set of pixels;
   turning off the first transfer signal;
   asserting a first image sample-and-hold signal to sample and hold the transferred charge from the floating diffusion regions of the first set of pixels;
   turning off the first image sample-and-hold signal; and
   turning off the first row activation signal.

8. The method of claim 7, further comprising:
   asserting a second reset sample-and-hold signal to sample and hold the reset charge from the floating diffusion regions of a second set of pixels in the first row;
   turning off the second reset sample-and-hold signal;
   asserting a second transfer signal associated with the second set of pixels to transfer charge from the photosensitive element to the floating diffusion region of each of the second set of pixels;
   turning off the second transfer signal;
   asserting a second image sample-and-hold signal to sample and hold the transferred charge from the floating diffusion regions of the second set of pixels; and
   turning off the second image sample-and-hold signal.

9. The method of claim 8, the first set of pixels are located in odd-numbered columns.

10. A method of reading out the values in a pixel array, the pixel array comprising photosensitive pixels arranged in rows and columns and each pixel comprising a photosensitive element and a floating diffusion region, the method comprising:
    asserting a first row activation signal associated with a first row in a pixel array to activate the first row;
    asserting a reset signal to reset the charge on the floating diffusion regions of all pixels in the first row;
    asserting a first reset sample-and-hold signal to sample and hold the reset charge from the floating diffusion regions of a first set of pixels in the first row;
    turning off the reset signal;

turning off the first reset sample-and-hold signal;
turning off the first row activation signal;
asserting a second row activation signal associated with a second row in a pixel array to activate the second row;
asserting the reset signal to reset the charge on the floating diffusion regions of all pixels in the second row;
asserting the first row activation signal;
asserting a second reset sample-and-hold signal to sample and hold the reset charge from the floating diffusion regions of a second set of pixels in the first row;
turning off the reset signal;
turning off the second reset sample-and-hold signal;
asserting a transfer signal associated with the first set of pixels and the second set of pixels to transfer charge from the photosensitive element to the floating diffusion region of each of the first set of pixels and second set of pixels;
turning off the transfer signal;
turning off the second row activation signal
asserting a first image sample-and-hold signal to sample and hold the transferred charge from the floating diffusion regions of the first set of pixels;
turning off the first image sample-and-hold signal;
turning off the first row activation signal;
asserting the second row activation signal;
asserting a second image sample-and-hold signal to sample and hold the transferred charge from the floating diffusion regions of the second set of pixels;
turning off the second image sample-and-hold signal;
and turning off the second row activation signal.

* * * * *